Oct. 1, 1968 W. E. BUEHLER ETAL 3,404,396
AIRBORNE CLEAR AIR TURBULENCE RADAR
Filed Jan. 24, 1967 3 Sheets-Sheet 1

INVENTORS
WALTER E. BUEHLER
CHARLES H. KING
BY CLARENCE D. LUNDEN

Lee R. Murchison

AGENT

INVENTORS.
WALTER E. BUEHLER
CHARLES H. KING
CLARENCE D. LUNDEN
BY Lee R. Murchison
AGENT Oct. 1, 1968     W. E. BUEHLER ET AL     3,404,396
AIRBORNE CLEAR AIR TURBULENCE RADAR
Filed Jan. 24, 1967     3 Sheets-Sheet 3

INVENTORS.
WALTER E. BUEHLER
CHARLES H. KING
CLARENCE D. LUNDEN
BY
Lee R. Murchison
AGENT United States Patent Office 3,404,396
Patented Oct. 1, 1968

3,404,396
AIRBORNE CLEAR AIR TURBULENCE RADAR
Walter E. Buehler, Issaquah, Charles H. King, Kent, and Clarence D. Lunden, Tacoma, Wash., assignors to The Boeing Company, Seattle, Wash., a corporation of Delaware
Filed Jan. 24, 1967, Ser. No. 611,461
10 Claims. (Cl. 343—5)

ABSTRACT OF THE DISCLOSURE

A monopole array antenna is attached atop an aircraft fuselage so as to irradiate in fixed, relative-to-the-aircraft, spotlight-like narrow-beam fashion, the area of space directly preceding the aircraft. High transmitted power, long wavelength, high receiver sensitivity radar is connected in conventional pulsed or preferably Doppler radar manner to the antenna in order to provide a special A-scope display of clear air turbulence.

Background field

This invention relates to airborne radar systems and more particularly to an airborne radar system for detecting clear air turbulence (CAT) which invention finds particular utility as a completely airborne aircraft clear air turbulence warning system.

Background prior art

Modern high speed aircraft are encountering a phenomena known as CAT which means clear-air-turbulence, a menace that occurs as turbulent areas in the sky invisible to human sight and the usual radar. This invisible menace can buffet even large aircraft in a structure-shattering fashion.

Although lasers, infrared, and ultraviolet devices have been at least theoretically considered for surveillance systems, they all suffer from lack of range determination and are subject to atmospheric attenuations that prohibit their use in a system for giving a distant forewarning of CAT which forewarning is increasingly important as aircraft speeds become increasingly greater.

A long wavelength bistatic (transmitter and receiver separated) CAT radar (not providing an A-scope return-signal amplitude versus range display) having remotely situated, fixed, ground stations is disclosed in The Boeing Company Patent No. 3,251,057. The bistatic system of that patent requires a fixed ground receiver and antennas in a ground position remote from a fixed ground transmitter and antennas used to irradiate an area of space from which the receiver detects energy (not backscatter) obliquely scattered from CAT within the area being irradiated. Obviously, this system requires two separate ground spaced antenna systems and is not suitable for use as a completely aircraft contained, completely airborne CAT radar system.

Objects

Accordingly, a principal object of this invention is to provide a CAT radar system which is especially suitable as an airborne CAT radar for propagating and receiving long wavelength electromagnetic pulse signals while simultaneously giving preferred high gain and spotlight-like narrow beam.

An important related object is to provide a novel antenna structure especially suitable for incorporation in an airborne CAT radar sytem which antenna means minimizes aircraft antenna large-size difficulties for long-wavelength pulsed signals while still providing preferred antenna pattern and gain.

A further important object is to provide a novel radar-derived A-scope display of clear-air turbulence in the form of backscatter, return echo, signal amplitude versus range.

Another object is to provide an apparatus embodying a method for detecting clear-air turbulence.

Invention summary

In accordance with the teachings of the present invention the above advantages and objects are achieved in the preferred embodiment herein described through this invention of a completely airborne aircraft clear-air turbulence, CAT, weather radar of relatively (to previous weather radars: 3, 6, or 10 cm.) long wavelengths: e.g., around 1 to 100 meters or more and extremely high receiving sensitivity such that "refractive backscatter" (140 db weaker than transmitted pulse impinging on CAT, the major portion having passed on through the generally transparency offered by CAT) can be detected from clear-air turbulence variations in the refractive index of air over distances such as, for example, 3 or more meters when observed from a distance of several miles. This detection and display of CAT, in the described preferred embodiment, is accomplished by a novel end-fire multi-element monopole airborne antenna structure giving the required high gain for long wavelength propagation with spotlight-like narrow-beam irradiation along with great structural strength and minimized aerodynamic drag, when used in combination with high-power, high-sensitivity long wavelength radar.

Summarily then, a multiple element end-fire array antenna, such as monopole or equivalent slot array suitable for integrating along an aircraft's exterior fuselage, in conjunction with high-power, high-sensitivity airborne radar of very long wavelengths provides a novel A-scope display of clear-air turbulence in the form of a plot of refractive backscatter return signal amplitude versus range along a fixed forwardly directed azimuth from an aircraft.

Figures

FIGURE 5b is an end cross-sectional view of the notch antenna feed element of FIGURE 5a.

Theory

Experimental study of CAT indicates that only CAT in the order of size magnitude of the major aircraft dimensions is hazardous to aircraft flight. Moreover, CAT is perhaps best described as opaque or transparent relative to electromagnetic radar propagations such that only about 1 meter wavelengths or greater have been found suitable for producing refractive backscatter suitable for detecting the presence of the CAT. This type of long wavelength radar is to be taken in contradiction to the well known short wavelength radars required to detect small particles (i.e., sleet, snow, rain) connected with the usual cloud-associated disturbances depicted in the usual PPI type of weather radar, which short wavelength signals have been found to pass on through CAT without definitive refractive backscatter return in order to detect the CAT. It may be that this experimentally-realized distinction can be viewed as somewhat similar to long wavelength water waves that find comparative ease of reflection from a large floating object (analagous to mesoscale CAT) whereas short wavelength wavelets expire against such a large floating object, suffering little if any reflection.

Thus, a fixed forward-looking, narrow-beam, long-wavelength radar having an A-scope CAT display of backscatter return-signal amplitude versus range along a fixed azimuth immediately preceding an aircraft is obtained in the preferred embodiment for which illustration is made with the above defined figures, and which preferred embodiment is more particularly defined in connection with the figures by the following description of the construction and operation of a preferred embodiment.

Construction

Figure 1:
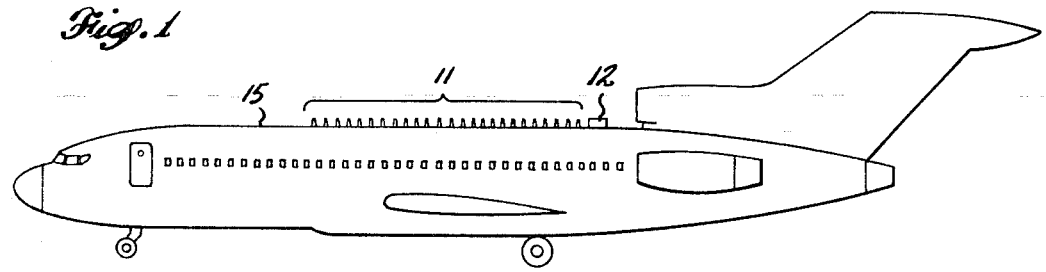
FIGURE 1 is a side view of an aircraft showing the installation of a novel antenna array preferred for the practice of this airborne clear-air turbulence radar: 56 conical directive elements (25 shown) and a radome housing a notch-blade feed element and a zig-zag reflective element.
Figure 1:
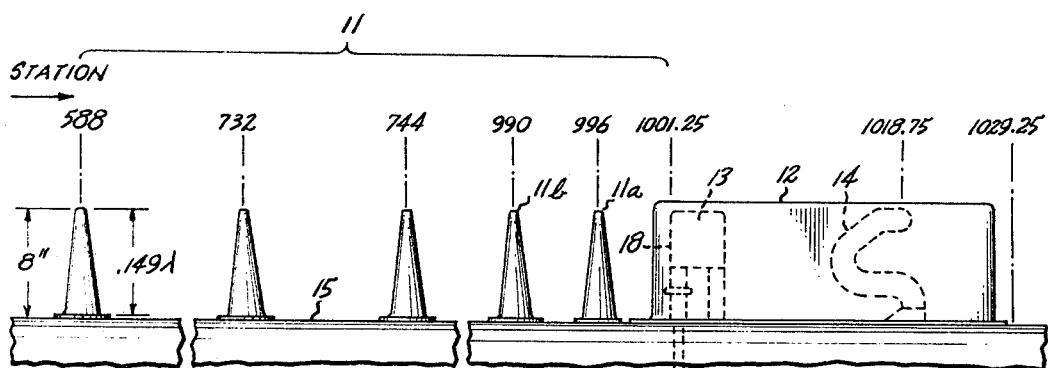

FIGURE 1 is a side view of the placement of the novel antenna structure of this invention as has been found experimentally to be particularly suitable for use with a 219.5 mHz. radar on the Boeing 727 aircraft. In this preferred embodiment there are 56 8-inch tall conical directive elements in an array 11 (only 25 shown in FIGURE 1) colinear with a rectangular radome 12 housing a feed element 13 (see FIG. 2 and FIG. 5) and a zig-zag reflective element 14. All of the elements 11, 13, 14 are colinearly attached to the aircraft's skin along the top centerline of the skin 15 of the aircraft's fuselage. A practical way of attaching the directive elements 11 to the aircraft is to flare (¾ inch) the bottom of each conical director and attach several of the directive elements each by six rivets to a plate: (not shown, except in part in FIGURE 5 as the plate 37 to which in an actual experimental embodiment the zig-zag reflective element 14, the feed element 13 and the first conical directive element 11a were all three attached). The respective plates are then conventionally bolted to nut plates affixed in the skin of the aircraft (not shown).

Each conical directive element 11, etc., is spaced 6 inches from its adjoining directive elements out to approximately ⅔ (not critical) of directive element array's 11 length whereafter the spacing is 12 inches. The leading edge 18 of the feed element 13 is 5.25 inches behind the center of the first conical directive element 11a, and the center of the base of the zig-zag reflective element 14 is 17.50 inches behind the leading edge 18. Some representative actual Boeing 727 aircraft position (or station) numbers in inches along the aircraft fuselage are given in FIGURE 2 which numbers 19 correspond with the above description for a 219.5 mHz. airborne CAT radar system.

In this preferred embodiment, aluminum is suitable for building suitable directive elements 11 which are spun aluminum truncated cones having a 2½ inch base diameter and a ½ inch tip diameter. The thickness of the hollow truncated conical shell is not critical although a nominal thickness of 0.020 inch is suitable. Any comparable conductive material such as copper is equally suitable.

The conical shape for the direction elements 11 has been found to provide an antenna monopole structure having excellent aerodynamic strength with a minimum of degradation of aircraft performance such as may occur by a crosswind striking the elements. The electrical size of the elements is determined according to the accepted manner for determining the dimensions of directive elements as more particularly explained in Chapter 24 entitled "TV Receiving Antennas" in Jasik's Antenna Engineering Handbook.

Figure 2:
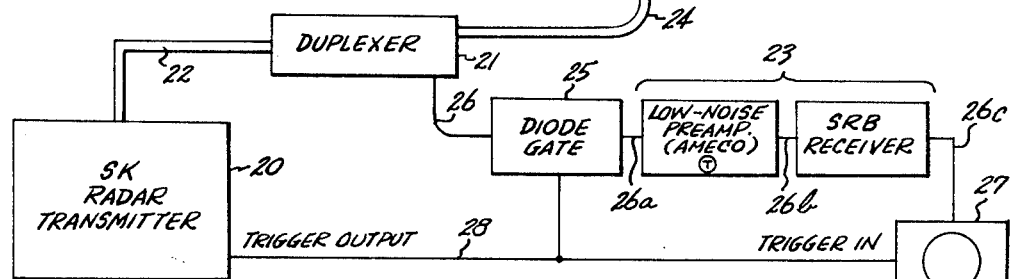
FIGURE 2 is an enlarged side view of the feed element, zig-zag reflective element and a representative portion of the directive elements of the antenna array of FIGURE 1 along with a block diagram defining a preferred associated high-transmit-power, long-wavelength, high-receiver-sensitivity radar equipment.

Now more particularly to the block diagram radar equipment portion of FIGURE 2 in which a conventional duplexer 21 is suitably conventionally connected (coax or as shown in FIGURE 5 a first waveguide) 24 to the antenna feed element 13. The duplexer 20 is connected to provide conventional time sharing of the antenna 11, 13, 14 by a conventional high-power radar transmitter 20 and a very sensitive, radar receiver combination 23 comprised of a conventional low-noise preamplifier 23a and a conventional Navy SRB receiver 23b.

A second waveguide 22 connects the conventional high power radar transmitter 20 to the duplexer 21. Conventional connections 26, 26a, 26b, 26c interconnect the radar receiver combination 23, thence through a conventional diode gate 25 to the duplexer 21 so as to provide vertical deflection control proportional to received signal amplitude to an A-scope display 27 from the radar receiver combination 23. A trigger connection 28 from the radar transmitter 20 causes the diode gate 25 to short any input to the receiver combination 23 to ground during the initiation of a radar pulse from the radar transmitter 20 while conventionally simultaneously controlling the initiation of a horizontal (range) sweep of the A-scope display 27.

A suitable conventional transmitter 20 is a conventional pulsed self-excited ring oscillator using either tubes or solid state and in practice a Navy SK radar transmitter has been found suitable where it is capable of providing 250 kw. peak power at a pulse length of 6 microseconds with a duty cycle of 60 c.p.s.

A suitable receiver combination 23 is a conventional VHF receiver with a noise figure of 3.5 db (i.e. threshold sensitivity) and bandwidth of 150 kc. and a recovery time of 6 microseconds or better. In practice, a conventional Navy SRB receiver having added to its input a conventional low noise preamplifier (Nuvistor as obtainable from RCA) is found to be suitable to attain these requirements.

A suitable conventional diode gate 25 is constructed by conventionally connecting a group of diodes from the center conductor (anode of diode) of a coax to ground (cathode) and then back-biasing the diodes with a suitable direct current negative voltage. A coil in series with the negative back-biased voltage to block off RF voltages and back-bias voltage is selected to be above the expected received-signal amplitudes so that the received signals are passed on to the receiver combination 23 from the duplexer 21 while a trigger voltage at the leading edge of the transmitted radar pulse is used to override the back-bias voltage, driving the diodes "on" and shorting any of the initiated radar pulse energy which appears at the receiver combination input during the initiation of a radar pulse through the duplexer.

Figure 5A:
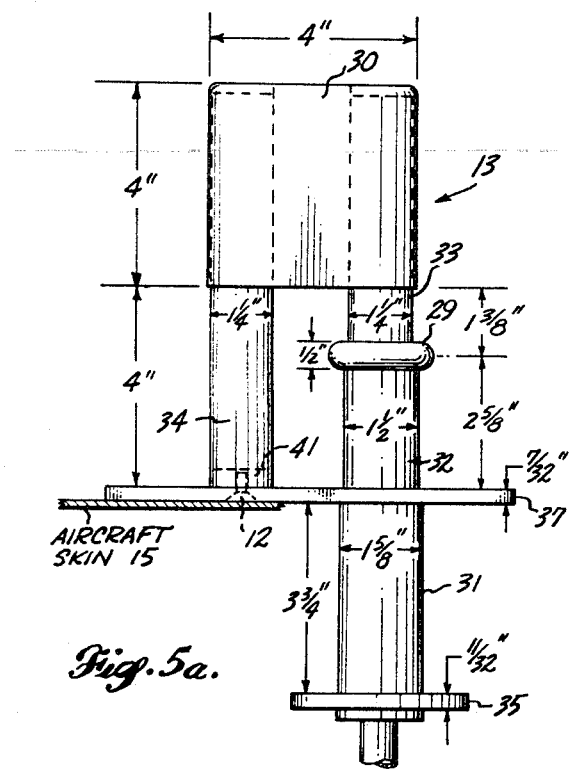
FIGURE 5a is a side view of a novel notch antenna feed element preferred for use in the apparatus of this invention.
Figure 5B:
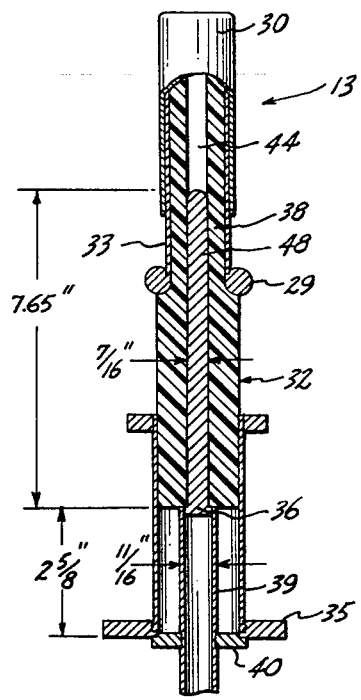
Figure 5C:
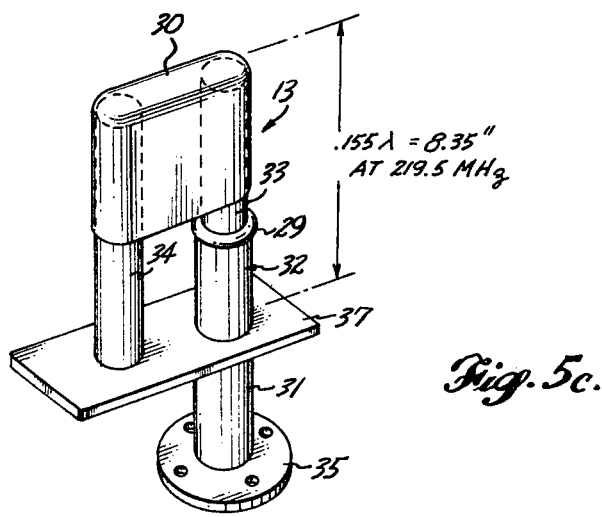
FIGURE 5c is a pictorial view of the notch antenna feed element of FIGURES 5a and 5b.

A suitable feed element 13 is now described in connection with FIGURES 5a, 5b and 5c:

A plate 37, as hereinbefore explained, is bolted to the aircraft skin 15 of the aircraft's fuselage. A screw 42 extends through the plate 37 into the metallic end 41 of a hollow first small pipe 34 slightly less (say .20 inch) than 8 inches long and of the dimensions given in FIGURES 5 whereby the first small pipe is attached to the plate 37.

An elongated metallic cap 30 of the dimensions shown is placed snugly over the end of the first small pipe 34 and a second small pipe 33 snugly rests in the opposite side of the elongated metallic cap 30. A corona ring 29 generally of the dimensions shown is preferably silver soldered on the end of the second small pipe 33 exterior to the cap 30. A suitable dielectric 38 such as Teflon extends through the second small pipe to the top of the elongated metallic cap 30. The dielectric 38 also extends, open to its surroundings, through a hole through the plate 37 and into a large pipe 31 fitted into the hole through the plate 37. A flange 35 is fitted on the opposite end of the large pipe 31 and a support 40 in the opposite end centrally supports a waveguide 39 from the duplexer (FIG. 2) which waveguide has a metallic plug 36 (supporting plug 36 extension into waveguide not critical) in its upper end which plug 36 is integral with the end of a 7.65 inch-long round probe 48 extending from the top of the waveguide up through the center of the dielectric 38 through a corresponding cavity 44 centered up through the dielectric. The dielectric 38 extends across and weather-tight seals a notch 32 formed between the corona ring 29 and the plate 37.

The probe 48 provides capacitive coupling across the notch 32 formed between the corona ring 29 and the plate 37. Initially the dielectric 38 supports the second small pipe as the elongated metallic cap 30 is slipped downward on the two small pipes 34, 33 in the initial tuning of the notch antenna 13. The cavity above the probe 48 to the top of the elongated metallic cap is conventionally filled with vacuum grease. When the elongated metallic cap 30 is slipped down sufficiently to tune the notch antenna 13, its bottom edge is preferably silver soldered in so far as possible to the two small pipes 34, 33.

In the above the length of each of the two small pipes 34, 33 is slightly less than 8 inches in order to allow the tuning operation and optionally the waveguide 39 can be allowed to slide down slightly on the lower end of the dielectric where it strikes the top of the waveguide 39 trimmed "off" a corresponding amount.

The metallic pipes 34, 33, 31, waveguide 39, probe 48 and plug 36, corona ring 29, support, cap 30 and screw 42 may be brass or other suitable conductor. The pipes and cap have a nominal thickness of 0.040 inch although this is not critical.

Figure 6:
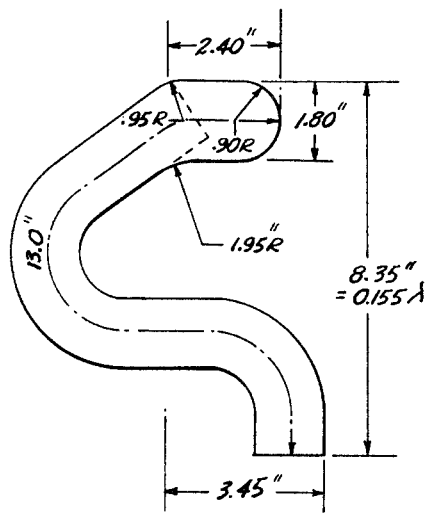
FIGURE 6 is a side view, including dimensions found suitable for operation at 219.5 mHz., of a zig-zag reflector element for the antenna array of FIGURES 1 and 2.

A suitable zig-zag reflective element 14 for the preferred embodiment 219.5 mHz. frequency is disclosed in dimensional detail in FIGURE 6. It is round, of the dimensions shown (in inches) and may be of aluminum or other conductive material such as brass soldered (silver preferred for strength) to the hereinbefore described plate 37 shared by the first directive element 11a, the feed element 13 and the reflective element 14. This element was so designed in order to give it the extra electrical length required for a reflective element while still keeping its actual physical height to the 8 inches of the other antenna elements.

Operation

Figure 3:
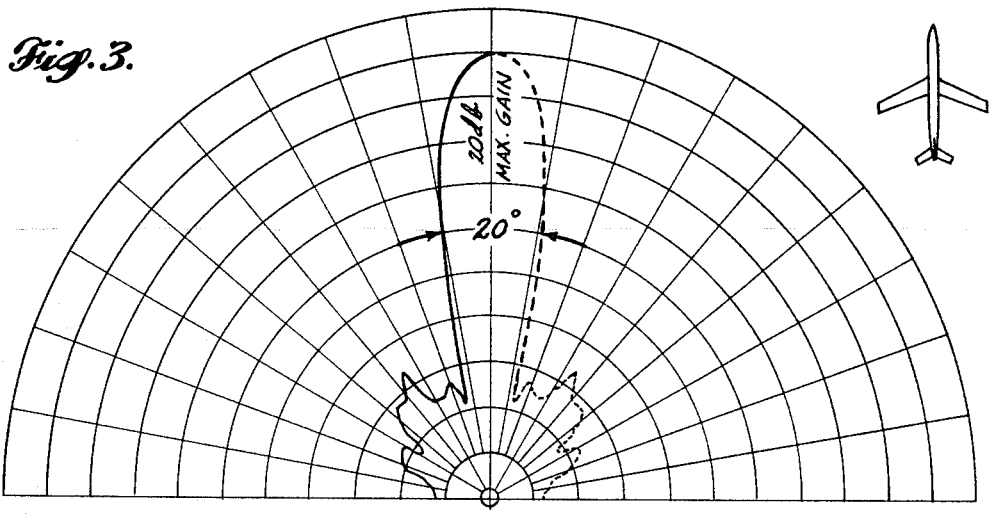
FIGURE 3 is a plot of a representative horizontal plane antenna pattern (gain vs. azimuth) determined for the antenna of FIGURES 1 and 2 which is representative of the three-dimensional configuration of the antenna gain.

The over-all CAT radar system operation is as follows:

An antenna monopole array 11, 13, 14 (FIGS. 1 and 2) produces a gain (FIG. 3) and corresponding area of surveillance immediately preceding an aircraft upon which the antenna's fuselage the antenna is centered. A pulsed radar transmitter 20 and receiver combination 23 (FIG. 2) time-share by way of a duplexer 21 and diode switch 25 the antenna array 11, 13, 14 (FIGS. 1 and 2). The transmitter 20 gives the required periodicity of pulse burst signals for the range of surveillance (preferred embodiment, 50,000 ft.) desired while simultaneously providing a trigger pulse 28 (FIG. 2) to gate "off" the leakage of any of the transmitted pulse from the duplexer through the diode gate 25 to the receiver combination 23.

Figure 4A:
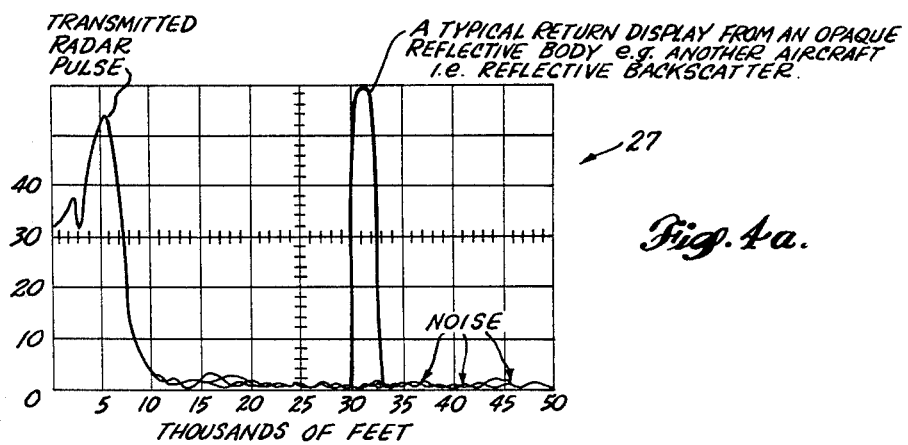
FIGURE 4a is a typical amplitude vs. range A-scope display showing return from an opaque, reflective body (reflective backscatter, e.g., from another aircraft) and a typical noise display but without a noticeable display of refractive (CAT) backscatter return.

The transmitter 20 trigger pulse 28 simultaneously starts the range scan on an A-scope. After the trigger pulse 28 and the transmitted radar pulse leaves the antenna array 11, 13, 14, the diode gate 25 again opens a path from the duplexer 21 to the receiver combination 23 the output receive signal amplitude which controls the vertical of the A-scope 27 to provide a display of backscatter return signal (both reflective and refractive) as disclosed in FIGS. 4a and 4b.

Figure 4B:
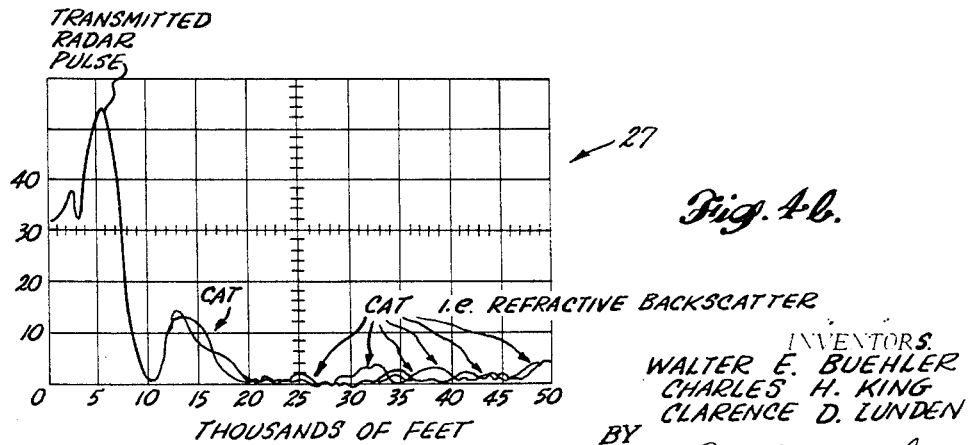
FIGURE 4b is a typical amplitude vs. range A-scope display showing typical refractive backscatter return from the translucent or transparent variation in the index of refraction as characterized by clear-air turbulence (i.e., opaque translucent or transparent with reference to the radar-frequency propagation).

In particular, it is to be noted that even with the duplexer and diode gating some of the transmitted pulse is recognized by the very sensitive receiver combination 23 and appears on the A-scope (marked "Transmitted Radar Pulse"). A reflective backscatter return signal is drawn in on FIGURE 4a along with "Noise" in order to clearly teach the distinction between these displays and that of the transmitted pulse from the display of clear air turbulence (marked "CAT") as shown in FIGURE 4b which is drawn from a picture of an actual A-scope display of CAT which was confirmed by immediate flight through the area of surveillance for the FIGURE 4b.

Further embodiments

As a modification in the preferred embodiment described in connection with FIGURE 2 ground return cancellation can be achieved by moving target indicator circuits (MTI) conventionally using delay lines to filter out unwanted returns or by Doppler techniques conventionally using filters to eliminate unwanted returns.

Because of the layer-like occurrence in which CAT turbulent regions has been found, in some instances it may be desirable or even preferred to use one or even two long array radar antennas. In which cases the antennas can be broadside arrays respectively one array directed above or two arrays directed both above and below the aircraft. Thus, an aircraft so equipped and approaching such a CAT layer at a very gradual, i.e., acute angle has long forewarning of such a CAT encounter.

A suitable broadside array for these purposes can be formed by placing a colinear multiple-towel-bar looking array of elements axially down the fuselage exterior. In such a case, each metallic bar is $0.8\lambda$ long and supported parallel to the fuselage by two metallic end rods all three in each element being integral. Adjacent elements are spaced to provide the required broadside array phasing and rod-and-bar sizes are selected to provide the required aerodynamic properties. As a feed a coax center conductor is brought through the fuselage and through one of the rods in the center of the array which rod is made hollow, out through a hole in the rod and soldered to the interconnection of the rod and bar (balun) on the adjacent element, the coax ground being connected (shorted) to the hollow rod and aircraft fuselage ground plane.

A suitable slot array for giving either an end-fire narrow beam off the nose of the aircraft or a broadside array effect can be had by spacing axially down the fuselage an array of dielectric sealed cavity-backed slots each $0.05\lambda$ wide, $\lambda/2$ long and with $\lambda/2$, sidewise spacing down the fuselage. This arrangement requires a coaxial feed cable to each slot with the center coax connector conventionally connected across the width of its slot. A conventional power divider and phasing lines are required to provide the required slot phasing for either a broadside or end-fire operation.

Time sharing between broadside and end-fire operation can be conventionally obtained for one set of suitable radar equipment from the above described slot array. Alternatively, a single radar equipment can be switched between upward and downward looking broadside arrays or thirdly in connection with a narrow forward-looking beam as described in the preferred embodiment of FIGURE 2.

These and other aspects of the invention will be recognized by those skilled in the art on the basis of the foregoing disclosure of the prefererd embodiment and practice thereof as encompassed by the following claims.

What is claimed is:

1. An airborne clear air turbulence radar system comprising,
    (1) transmitter means for generating high-power long-wavelength repetitive pulsed signals of radio frequency energy,
    (2) receiver means for providing highly sensitive amplification of signals at said long wavelengths,
    (3) multiple element end-fire array antenna means for providing an extremely narrow spotlight-like beam of irridation,
    (4) duplexer means connected to said antenna means for providing simultaneous connection of both said transmitter means and said receiver means to said antenna means, said duplexer means also providing isolation of said transmitter means from said receiver means whereby a transmision path from said transmitter means through said duplexer to said antenna means is maintained while a received signal path from said antenna through said duplexer means to said receiver means is simultaneously maintained.
    (5) gating means interconnected between said duplexer means and said receiver means, said gating means being responsive to the initiation of a pulsed signal from said transmitter means through said duplexer means to said antenna means in order that the circuit continuity between said duplexer means and said receiver means is interrupted during said pulse signal emission from said transmitter means in order to provide further isolation of said highly sensitive receiver means from said transmitter means during the transmission of a high-power pulse signal, and
    (6) two-dimensional spot scan display means connected to said receiver means, said spot scan display means being responsive to said greatly amplified signals from said receiver means for causing said spot scan to deflect in a first direction according to the amplitude of said greatly amplified signals, said display means also being connected to be responsive to the initiation of a pulsed signal from said transmitter means for causing successive sweeps of said spot scan across the display in a second direction orthogonal to said first direction, the initiation of said successive sweeps being coincident with the initiation of each said transmitter means pulse signal, said display means giving a visual display of received signal amplitude versus range display which includes in distinguishable form very low power level return signals received from refractive backscatter associated with clear air turbulence.

2. A clear air turbulence radar system as defined in claim 1 wherein said multiple element end-fire array antenna is comprised of
    (1) a parallel plurality of conical directive elements colinearly aligned down an aircraft's fuselage,
    (2) a notch antenna feed element at the end of said plurality of directive elements, said notch antenna connected with said duplexer for transmitting and receiving signals, and
    (3) a zig-zag reflective element placed colinear with said plurality of directive elements and said feed element, said reflector element being located on the opposite side of said feed element in order to make the antenna array directive in end-fire fashion off the end of the conical directive elements.

3. A clear air turbulence radar system as defined in claim 2 wherein said conical directive elements are each a hollow thin-shelled truncated cone closed at right angles with the axis of the cone at the truncated end so that the axial length of the cone is equal to the length required for a directive element at the operative frequency of said antenna.

4. A clear air turbulence radar system as defined in claim 2 wherein said notch feed element is comprised of,
    (1) a metallic plate for providing support and securement of the notch feed element to an aircraft fuselage, said plate being attached to said aircraft fuselage,
    (2) a first small hollow metallic pipe with one closed end attached to said plate such that said pipe is perpendicular to said plate,
    (3) a second small hollow metallic pipe spaced adjacent to said first small hollow metallic pipe, said second pipe also being perpendicular to said plate,
    (4) an elongated metallic cap positioned over the open ends of said pipes such that said pipes occupy the elongated ends of said mtallic cap in electrical contact with said metallic cap,
    (5) a corona ring integral with the end of said second hollow metallic pipe that protrudes from said elongated cap so as to form a non-metallic open notch between said corona ring and said metallic plate, said metallic plate having a hole immediately beneath said corona ring,
    (6) a metallic probe extending through said hole in said plate across said notch and through said corona ring into said second metallic pipe a sufficient distance to give proper impedance matching by the capacitive interaction between said second metallic pipe and said metallic probe,
    (7) dielectric means filling said second pipe around said probe and extending across said notch and through said hole in said plate for providing support and weatherproof sealing of said components, and
    (8) interconnection means connected to said metallic probe for providing an input for said notch feed element.

5. A clear air turbulence radar system as defined in claim 2 wherein said zig-zag reflector element comprises a metallic rod selected to be of actual over-all length to have the equivalent electrical appearance required for a reflective element at the operative wavelength, said metallic rod having an overall distance of extension above said plate substantially equal to one fourth of the operative wavelength.

6. A notch feed element for an antenna array, said notch feed element comprising,
    (1) a metallic plate for providing support and securement of the notch feed element,
    (2) a first small hollow metallic pipe with one closed end attached to said plate such that said pipe is perpendicular to said plate,
    (3) a second small hollow metallic pipe spaced adjacent to said first small hollow metallic pipe, said second pipe also being perpendicular to said plate,
    (4) an elongated metallic cap positioned over the open ends of said pipes such that said pipes occupy the elongated ends of said metallic cap in electrical contact with said metallic cap,
    (5) a corona ring integral with the end of said second hollow metallic pipe that protrudes from said elongated cap so as to form a non-metallic open notch between said corona ring and said metallic plate, said metallic plate having a hole immediately beneath said corona ring,
    (6) a metallic probe extending through said hole in said plate across said notch and through said corona ring into said second metallic pipe a sufficient distance to give proper impedance matching by the capacitive interaction between said second metallic pipe and said metallic probe,
    (7) dielectric means filling said second pipe around said probe and extending across said notch and through said hole in said plate for providing support and weatherproof sealing of said components, and (8) interconnection means connected to said metallic probe for providing an input for said notch feed element.

7. A multiple-element end-fire array antenna for use with associated transmitting and receiving apparatus on an aircraft comprised of,
   (1) a parallel plurality of conical directive elements colinearly aligned down the aircraft's fuselage,
   (2) a notch feed element at one end of said plurality of directive elements, said notch feed element having an input-output connection means for accepting signals from and transferring signals to the associated transmitting and receiving apparatus, and
   (3) a zig-zag reflective element placed colinear with said plurality of directive elements and feed element, said reflective element being located on the opposite side of said feed element from said plurality of conical directive elements in order to make the antenna array directive in end-fire fashion off the other end of said plurality of conical directive elements.

8. A method for the airborne detection of clear air turbulence comprising the steps of,
   (1) directing a long-wavelength, multiple-element narrow-beam antenna array at the area adjacent an aircraft, in fixed fashion relative to the aircraft,
   (2) pulsing said antenna array with high-power, long-wavelength radar energy,
   (3) time sharing the antenna array between the high-power pulsing with a high-sensitivity long-wavelength receiver connected to amplify long-wavelength radar return signals being received from the area adjacent the aircraft by said antenna array, and
   (4) displaying the amplitude of said long-wavelength radar return signals as a single-valued function of range in order to detect clear air turbulence occurring in said area adjacent the aircraft.

9. Airborne apparatus for the detection of clear air turbulence by an aircraft comprising in combination: a long-wavelength, multiple-element narrow-beam antenna array secured to an aircraft and held in fixed position thereon; radar energy means coupled with said array and operative to pulse said antenna array with high-power, long-wavelength radar energy; a high-sensitivity long-wavelength receiver; means coupling said receiver with said array and including means for time sharing the antenna array between the high-power pulsing by said radar means with said high-sensitivity long-wavelength receiver, said receiver being connected to amplify long-wavelength radar return signals being received from the area adjacent the aircraft by said antenna array: and information display means coupled with said receiver and displaying the amplitude of said long-wavelength radar return signals as a single-valued function of range, whereby clear air turbulence occurring in said area adjacent the aircraft is detected.

10. Apparatus as defined in claim 9 wherein said array includes a plurality of directive elements each extending outwardly from the fuselage of the aircraft and arranged in a substantially straight line pattern.

References Cited

UNITED STATES PATENTS

| | | |
|---|---|---|
| 2,245,246 | 6/1941 | Alexanderson. |
| 2,650,984 | 9/1953 | Mandel _____ 343—807 X |
| 2,822,536 | 2/1958 | Sandretto _____ 343—5 X |
| 3,096,520 | 7/1963 | Ehrenspeck _____ 343—833 X |

RODNEY D. BENNETT, *Primary Examiner.*

C. L. WHITHAM, *Assistant Examiner.*